United States Patent [19]

Todoriki

[11] Patent Number: 5,526,065
[45] Date of Patent: Jun. 11, 1996

[54] APPARATUS FOR DISPLAYING TELEVISION IMAGES APPLICABLE TO AUTOMOTIVE VEHICLE

[75] Inventor: Tsuyoshi Todoriki, Kanagawa-ken, Japan

[73] Assignee: Nissan Motor Company, Limited, Kanagawa-ken, Japan

[21] Appl. No.: 185,289

[22] Filed: Jan. 24, 1994

Related U.S. Application Data

[63] Continuation of Ser. No. 665,460, Mar. 5, 1991, abandoned.

[30] Foreign Application Priority Data

Mar. 6, 1990 [JP] Japan ......................................... 2-54531

[51] Int. Cl.⁶ ..................................................... H04N 5/72
[52] U.S. Cl. ............................ 348/832; 348/834; 348/835
[58] Field of Search ..................................... 348/832, 834, 348/835; 345/7, 8; 359/630, 631

[56] References Cited

U.S. PATENT DOCUMENTS

| | | | |
|---|---|---|---|
| 4,908,611 | 3/1990 | Iino | 340/705 |
| 5,059,957 | 10/1991 | Todoriki et al. | 340/705 |
| 5,061,946 | 10/1991 | Schiffman | 340/980 |

FOREIGN PATENT DOCUMENTS

| | | |
|---|---|---|
| 0088281 | 2/1983 | European Pat. Off. . |
| 62-7275 | 1/1987 | Japan . |
| 64-28066 | 2/1989 | Japan . |
| 1-248885 | 10/1989 | Japan . |

*Primary Examiner*—Edward L. Coles, Sr.
*Assistant Examiner*—Thomas L. Stoll
*Attorney, Agent, or Firm*—Lowe, Price, LeBlanc & Becker

[57] ABSTRACT

An apparatus for displaying a television image on a television monitor applicable to a vehicle passenger compartment. In the television image displaying apparatus, the television monitor is installed on a center console of a vehicle passenger compartment. A liquid crystal filter is arranged on a television monitor screen which has variable transmittance according to a voltage applied across a whole surface electrode thereof. The liquid crystal filter serves to limit an angle of visible field around a driver's seat position with a front passenger seat position being provided a high image transmittance. In addition, a louver type filter is arranged between the TV monitor screen and liquid crystal filter. The louver type filter generally has a plurality of fine louvers, each elongate direction of the louvers being aligned in the horizontal direction. However, in a first preferred embodiment, the elongate directions of the respective louvers are directed toward the driver's seat position, inclining through a predetermined angle at the driver's seat side of the louvers with respect to the horizontal direction of the vehicle. In a second preferred embodiment, a plurality of lamps are disposed on a peripheral position at the front passenger's seat position of the TV monitor screen. The substantially same effect as the first preferred embodiment can be achieved.

18 Claims, 9 Drawing Sheets

APPARATUS FOR DISPLAYING TELEVISION IMAGES APPLICABLE TO AUTOMOTIVE VEHICLE

This application is a continuation of application is a continuation of application Ser. No. 07/665,460 filed Mar. 5, 1991.

BACKGROUND OF THE INVENTION

(1) Field of the Invention

The present invention relates to an apparatus for displaying television images applicable to automotive vehicles, particularly, relates to a technique for limiting an angle of a field of view from the driver's seat position of the vehicle so as to provide no recognition of the TV images from the driver's seat position.

(2) Description of the Background Art

A Japanese Patent Application First Publication No. Heisei 1-248,885 published on Oct. 4, 1989 exemplifies one previously proposed Television (hereinafter abbreviated to TV) image displaying apparatus applicable to automotive vehicles.

In the above-identified Japanese Patent Application First Publication, a liquid crystal filter is installed on a front portion of a TV monitor (or CRT (Cathode Ray Tube).

The TV monitor is installed on a center console of the vehicle compartment. The liquid crystal filter is controlled by means of a liquid filter control/drive circuit.

The liquid crystal filter is provided with a whole electrode on its whole surface. When the liquid crystal filter receives a voltage applied across the surface electrode, the whole surface becomes polarized (black as viewed from its front surface).

At this time, if a maximum direction of a contrast ratio of the liquid crystal filter is set toward eyes of the driver (one of viewers of the TV monitor), the images of the TV monitor cannot be viewed from the driver's position.

However, since the angle of (viewing) field of the liquid crystal filter is narrowed directionally, the TV images can still be viewed from the passenger seat side.

In a case where a power supply switch of the TV monitor is turned on and where signals derived from respective vehicle components indicate that the vehicle stops safely, the liquid crystal filter is in an off state (no voltage is applied across the surface electrode). It is noted that the safe stop state means that: 1) vehicle speed is zero (vehicle speed indicating signal indicates that the vehicle speed is zero); 2) a hand brake (also called parking brake) placed on a side of the driver's seat is operated (sufficiently pulled up toward the driver); and, 3) a gear position indicating signal derived from an automatic power transmission indicates that the gear lever thereof is placed on a parking position or neutral position.

As described above, the safely stopped state is defined as a state in which the three conditions are satisfied.

In this way, the liquid crystal filter control/drive circuit receives no voltage when the three conditions are satisfied and the power supply switch of the TV monitor is turned on.

When the liquid crystal filter is in the off state, light is transmitted in an oblique direction in addition to other directions allowing both passenger and driver to view TV images through the liquid crystal filter.

On the other hand, even though the TV monitor is turned on, the liquid crystal filter control/drive circuit causes the liquid crystal filter to be in the on state (a predetermined voltage is applied) if any one of the three conditions is not satisfied. If the liquid crystal filter is in the on state, light in a direction toward the eyes of the driver's position from the liquid crystal filter which is the maximum contrast direction of the liquid crystal filter, becomes polarized (black), the TV images cannot be viewed from a position at which the driver's eyes are situated.

At this time, since the angle of field through which the polarization occurs is narrow, the liquid crystal filter can transmit the light from the TV monitor toward the passenger's seat side and the passenger can view the TV images.

As described above, the driver can view the TV images through the liquid crystal filter only when the vehicle safely stops. Consequently, safe stopping practices by the driver can be assured and improved.

In addition, to prevent the TV image from being viewed through a front windshield, a louver type filter is installed between the liquid crystal filter and screen of the TV monitor.

The louver type filter includes a multiple number of fine louvers (aligned in a window blind form) placed in a transparent plate (for example, a plate made of synthetic resin).

When the louver type filter is installed on the front portion (screen) of the TV monitor so that elongate direction of the louvers of the louver type filter coincides with the horizontal direction and the light is impinged on a rear side of the louver type filter, a light transmission area is limited only in an area between an oblique upper direction (about 45 degrees upward with respect to the horizontal direction) and an oblique lower direction (about 45 degrees downward with respect to the horizontal direction). The directions except the transmission area described above is defined as a light interruption area. Hence, if the louver type filter is disposed so that an upper light interruption area is placed between the liquid crystal display and the front windshield, i.e., the elongate directions of the louvers are disposed so as to align in a substantially horizontal direction, the light derived from the TV image cannot be directed toward the front windshield.

FIG. 1 shows a characteristic graph of a relationship between viewing position and the transmittance of the filters in the previously proposed TV image displaying apparatus described above.

As appreciated from FIG. 1, an overall transmittance of the filters, i.e., the liquid crystal filter and louver type filter is the addition of the transmittance of the liquid crystal filter and that of the louver type filter. However, since the light transmittance is high at the passenger's seat position, a passenger sitting in the front passenger seat can sufficiently view the TV screen images. On the other hand, since the light transmittance is remarkably low at the driver's seat position and the area in which the driver normally sits on the driver's seat wholly falls in the light interruption area, the TV screen images cannot be viewed by the driver during vehicle run.

However, the previously proposed TV image displaying apparatus has a drawback as described below.

That is to say, although, as the light interruption area, i.e., as the area in which the driver cannot view the TV images, an area in which the driver sits to drive the vehicle in a normal driving posture is set, a driver may tend to try to view the TV image with a posture out of the normal driving posture (out of the light interruption area), that is to say, a driver may tend to lean against the passenger's seat position when the vehicle runs at a cruise speed, at a very low speed, and/or during freeway running. This results in an unsafe driving situation which may endanger driver, passenger and the occupants of other vehicles.

SUMMARY OF THE INVENTION

It is, therefore, an object of the present invention to provide an improved TV image displaying apparatus applicable to an automotive vehicle in which a light interruption area from the TV images toward the vehicle driver is widened so that the driver during the run of the vehicle cannot view the TV images on the TV screen even if the driver moves toward a position out of the normal driving posture, i.e. toward the passenger's seat side.

The above-described object can be achieved by providing an apparatus for providing TV images on a TV monitor applicable to a vehicle passenger compartment, comprising: a) filter means, located on a front end of a TV monitor screen and having variable transmittance, for adjusting a visible recognition area of the images appearing on the TV monitor screen so that light from the images directed toward a driver's seat of the vehicle is interrupted; b) first detecting means for detecting whether the vehicle is moving and producing a first signal indicative thereof; c) controlling means for controlling the filter means so as to provide no image from the TV monitor screen toward the driver's seat side while the vehicle is moving in response to the signal output from the first detecting means, the controlling means providing a predetermined voltage for the filter means in response to the signal output from the first detecting means so that a first light interruption area interrupting the transmission of the TV monitor images to the driver's seat position is provided; and d) light transmission area restricting means, active in combination with the filter means, for further providing a second light interruption area wider than the first light interruption area for the driver's seat position while preventing a whole transmittance toward a front passenger seat side from being reduced so that the light transmitting area for the front passenger seat side has relatively high transmittance.

The above-described object can also be achieved by providing an apparatus for providing television images for a vehicle cabin, comprising: a) image projecting means projecting television images from its screen toward a space defined as a television viewing angle including at least a driver's seat position and a front passenger's seat position; b) liquid crystal filter means located above the screen of the image projecting means for selectively setting a variable recognition area in the space in response to an application of voltage across a whole surface electrode thereof; c) detecting means for detecting whether the vehicle is in a moving or stationary state and outputting a indicative signal when the vehicle is moving; d) controlling means for controlling the liquid crystal filter means to provide a first light interruption area of the liquid crystal filter means from the image projecting means to the driver's seat position, while at least providing a light transmitting area of the liquid crystal filter means from the image projecting means to the passenger seat position when the signal output from the detecting means is received; and e) light transmission area restricting means, active in combination with the liquid crystal filter means, for further increasing at least the first light interruption area of the liquid crystal filter means while providing substantially no effect on the light transmission area provided by the liquid crystal filter means.

BRIEF DESCRIPTION OF THE DRAWINGS

FIG. 2 (B) is a rough top view of the previously proposed TV image displaying apparatus applicable to the automotive vehicle described in the BACKGROUND OF THE INVENTION.

FIG. 3 (B) is an explanatory view of the louver type filter shown in FIG. 3 (A) for explaining a in the previously proposed TV image displaying light transmitting area of the louver type filter used apparatus.

DETAILED DESCRIPTION OF THE PREFERRED EMBODIMENTS

Reference will, hereinafter, be made to the drawings in order to facilitate a better understanding of the present invention.

Figure 1:
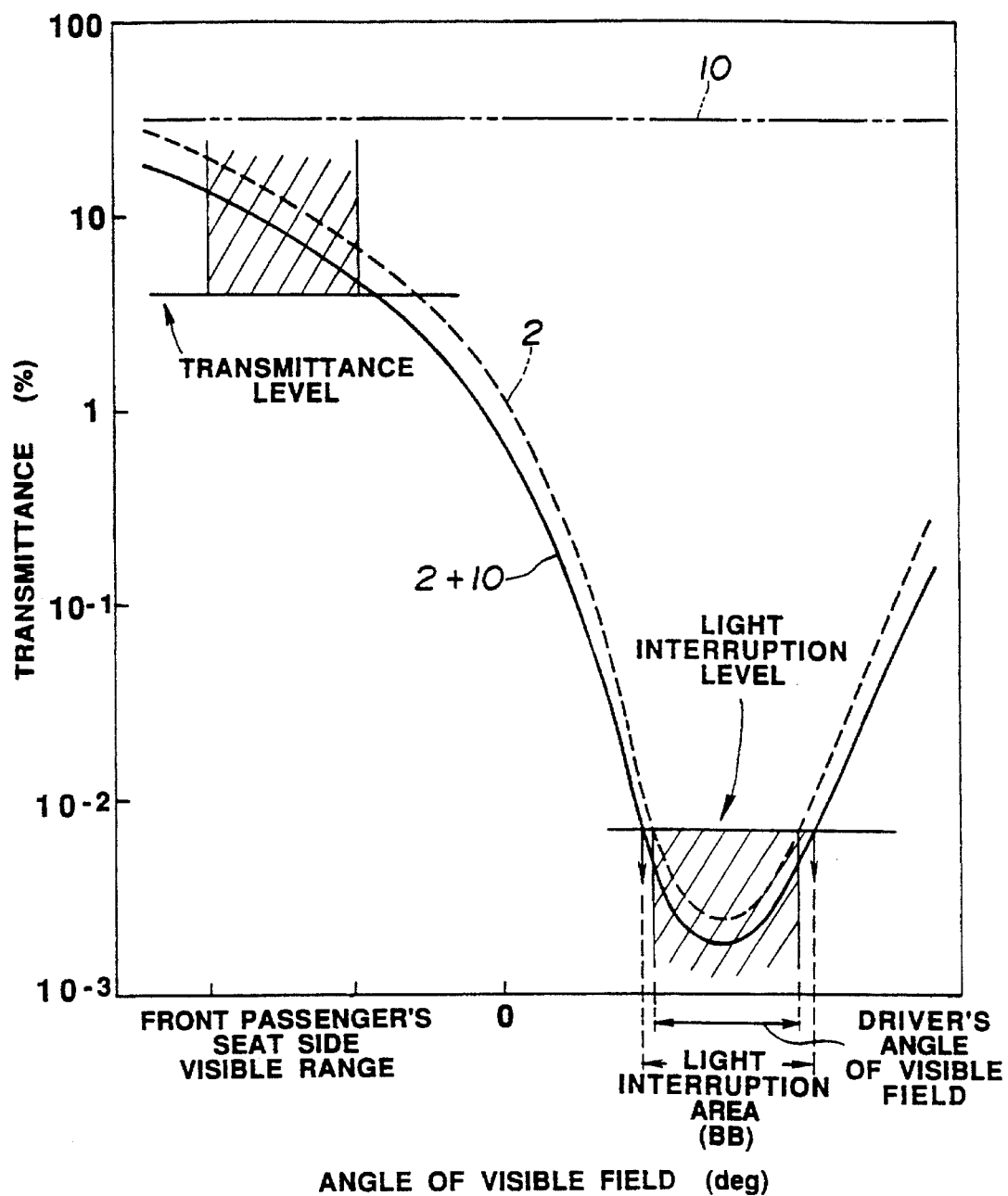
FIG. 1 is a characteristic graph representing a relationship between viewer position and light transmittance in a previously proposed TV image displaying apparatus described in the BACKGROUND OF THE INVENTION.
Figure 2A:
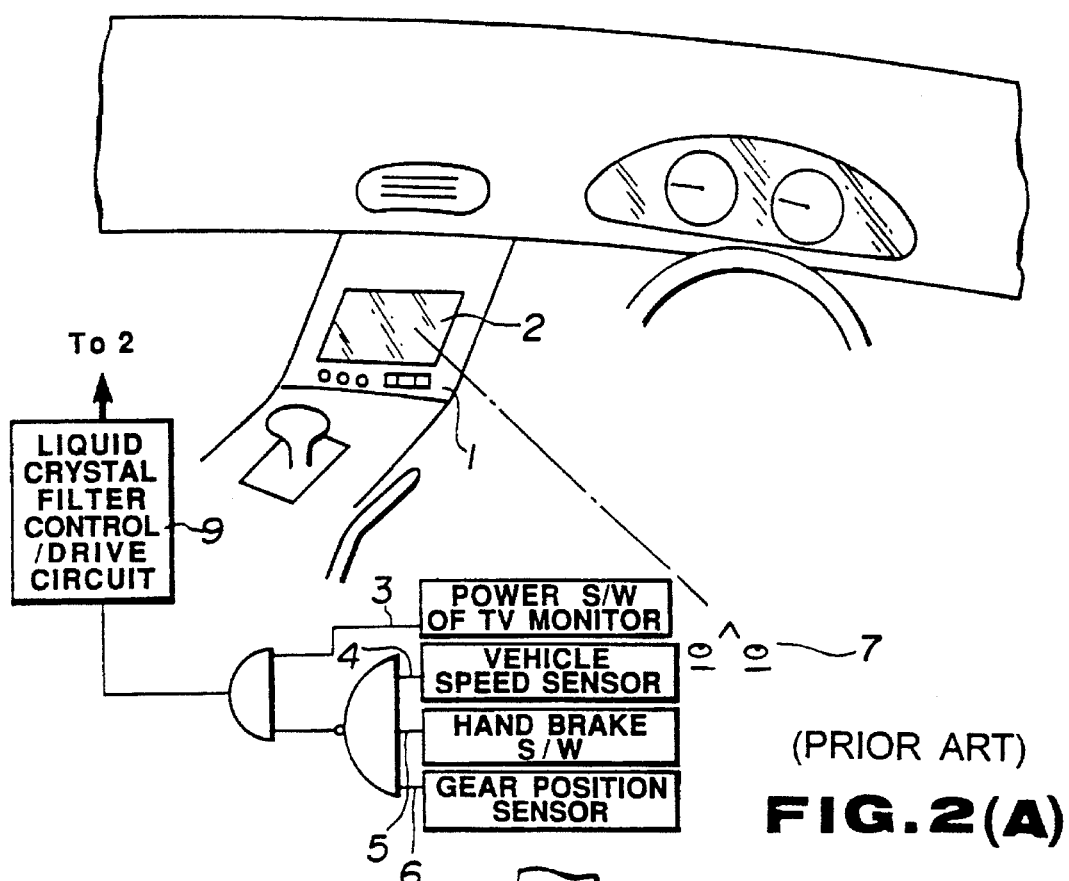
FIG. 2 (A) is a general view of the previously proposed TV image displaying apparatus applicable to an automotive vehicle described in the BACKGROUND OF THE INVENTION.
Figure 2B:
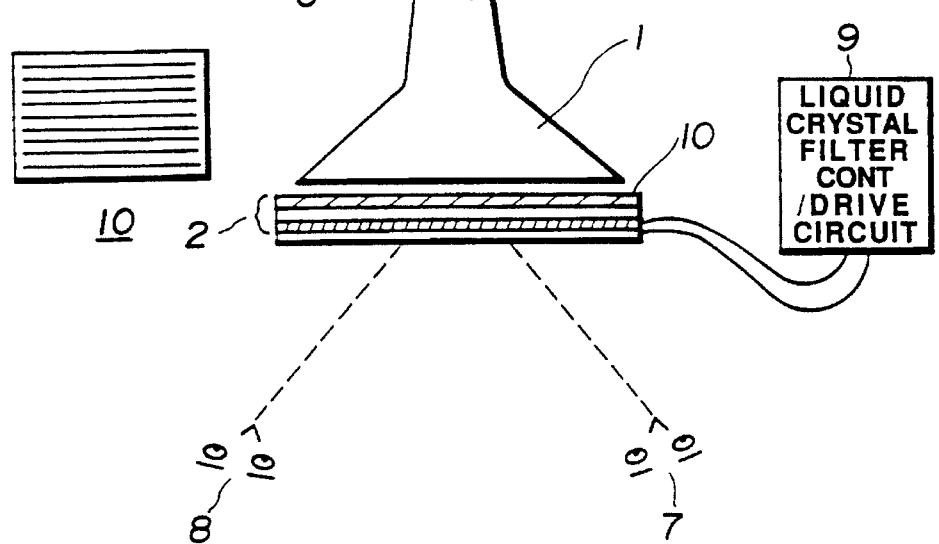
Figure 3A:
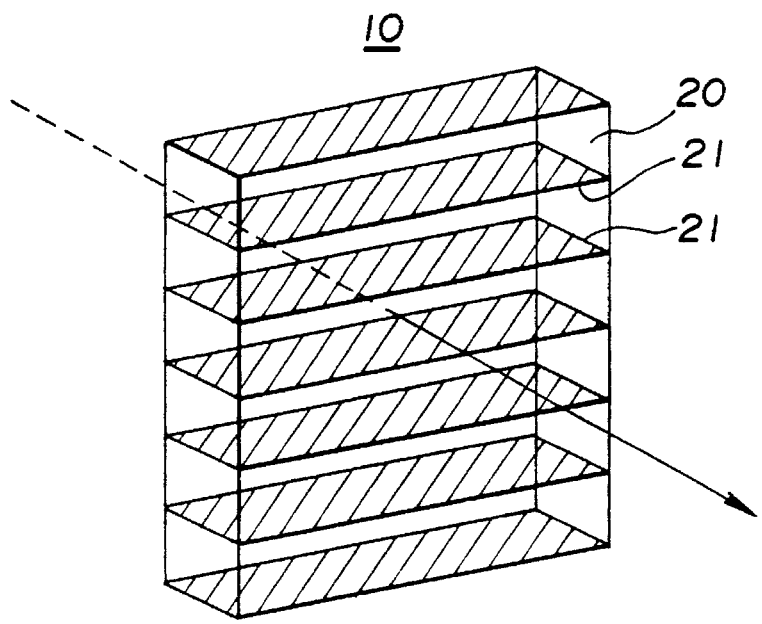
FIG. 3 (A) is a perspective view of a louver type filter shown in FIG. 2 (B).
Figure 3B:
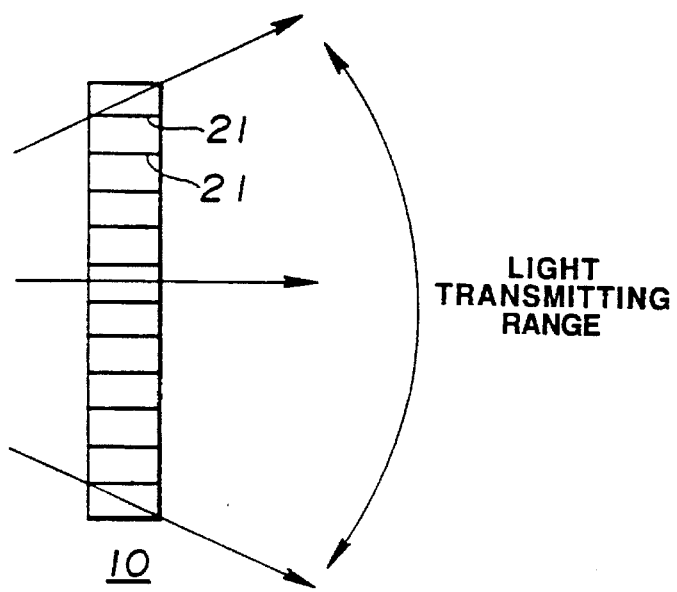

FIGS. 1 through 3 (B) show characteristics and structure of a previously proposed TV image displaying apparatus already described in the BACKGROUND OF THE INVENTION.

It is noted that the Japanese Patent Application First Publication No. Heisei 1-248885 described in the BACKGROUND OF THE INVENTION corresponds to U.S. patent application Ser. No. 329,225 filed on Mar. 27, 1989, (the disclosure of which is herein incorporated by reference) also assigned to the assignee of the present invention.

It is noted that, in FIG. 2 (A), numeral 1 denotes a TV monitor installed on a center console of a vehicle compartment. Numeral 2 denotes a liquid crystal filter. Numeral 3 denotes a first signal representing a power supply switch of the TV monitor. Numerals 4, 5, and 6 denote second, third, and fourth signals respectively representing that, vehicle speed is zero, a turn-on signal of a hand brake switch, a shift lever is placed in a parking position or neutral position of an automatic power transmission. It is also noted that the second signal 4 is derived from, e.g., a vehicle speed sensor, the third signal 5 is derived from, e.g., a switch of a hand brake, and the fourth signal 6 is derived from a gear position sensor which is turned on when the shift lever of the automatic power transmission is placed in the parking or neutral position. Numeral 7 denotes the eyes of the vehicle driver. Numeral 9 denotes a liquid crystal filter control/drive circuit.

In FIG. 2 (B), numeral 10 denotes a louver type filter. Numeral 8 denotes the eyes of a passenger in the front passenger seat.

In FIGS. 3 (A) and 3 (B), numeral 21 denotes a multiple number of louvers arranged in a transparent plate 20 made of a synthetic resin and constituting the louver type filter 10.

Figure 4A:
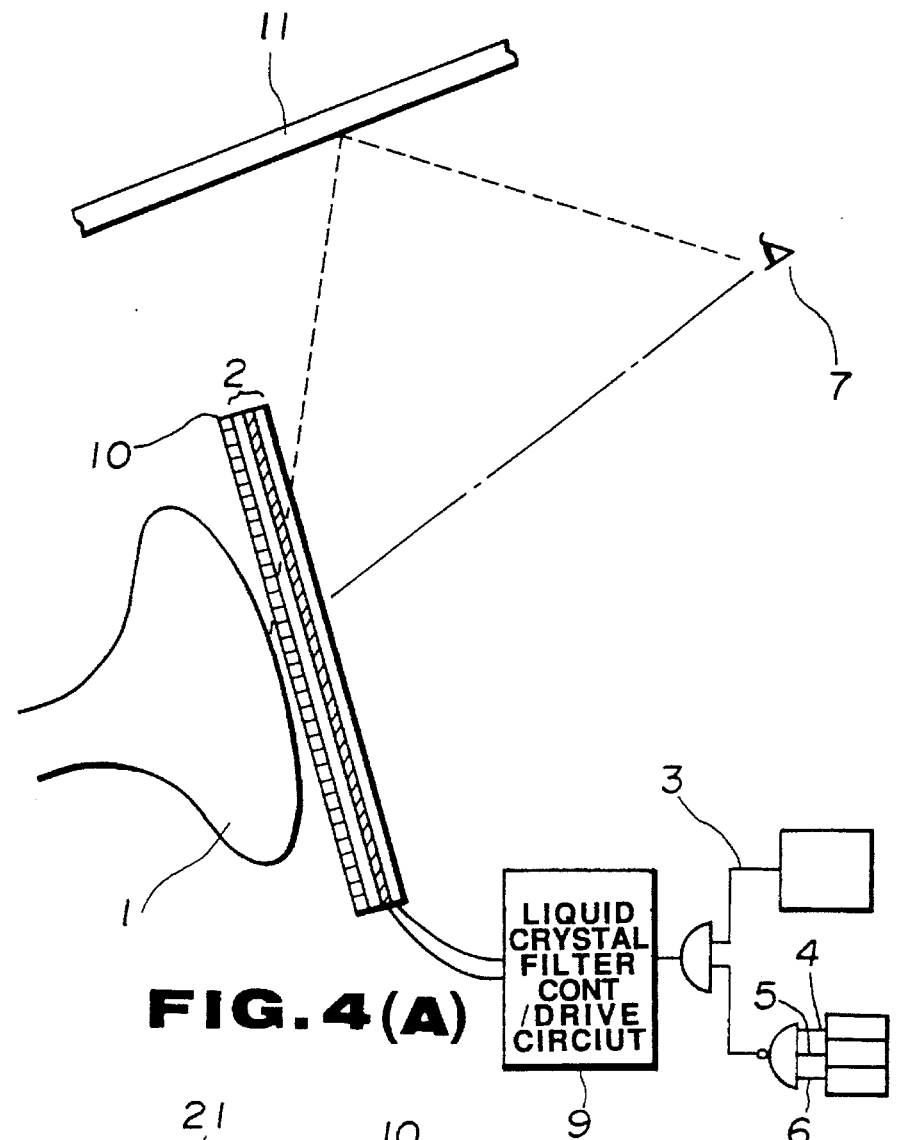
FIG. 4 (A) is a general view of a TV image displaying apparatus applicable to an automotive vehicle in a first preferred embodiment according to the present invention FIG. 4 (B) is a general view of the louver type filter used in the first preferred embodiment.
Figure 4B:
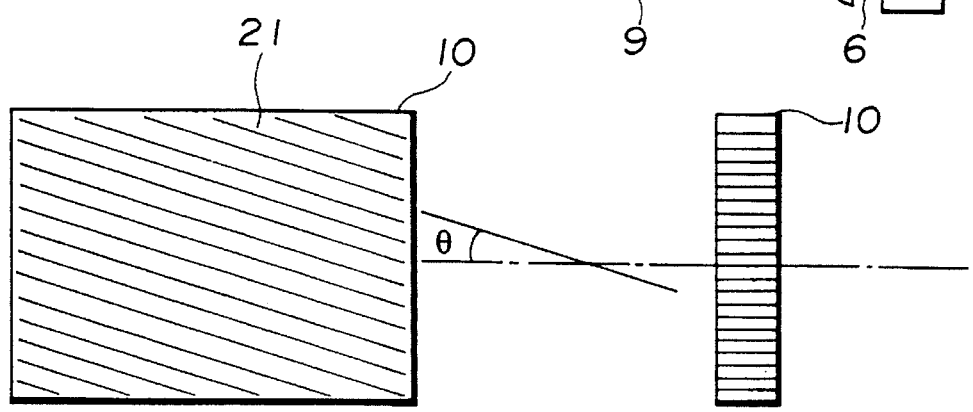

FIG. 4 (A) shows a general view of a TV image displaying apparatus applicable to the automotive vehicle in a first preferred embodiment according to the present invention.

In FIG. 4 (A), the TV monitor 1 is installed on the center console of the vehicle passenger compartment. The TV image screen is generally faced toward a center portion of the vehicle compartment. It is noted that both the liquid crystal filter 2 and louver type filter 10 are disposed on the front screen of the TV monitor 1 by means of a suitable supporting member. The surface electrode of the liquid crystal filter 10 is connected to the liquid crystal filter control/drive circuit 9 in the same way as described with reference to FIG. 2 (A). It is noted that numeral 11 shown in FIG. 4 (A) denotes the front windshield of the vehicle.

The structure of the louver type filter 10 is exemplified as shown in FIGS. 3 (A) and 3 (B).

In the first preferred embodiment, the louver type filter 10 is installed on the front screen of the TV monitor 1 in such a way that elongate directions of the respective louvers 21 are faced downward through an angle of $\theta$ with respect to the horizontal direction, as shown in FIG. 4 (B). In detail, the respective louvers of the louver type filter 10 are inclined so that the position of the eyes of the driver 7 substantially coincides with a perpendicular direction with respect to the elongate directions of the respective louvers 21.

In order to install the louver type filter 10 in the way described above, an angle of an end surface of the louver type filter 10 with respect to each louver 21 need be inclined through a predetermined angle 8.

FIG. 4 (B) shows the louver type filter 10 which meets the requirement of the first preferred embodiment described above.

It is noted that the structure of the first preferred embodiment except the structure of the louver type filter 10 is substantially the same as the previously proposed TV image displaying apparatus shown in FIGS. 2 (A) and 2 (B).

Operation of the first preferred embodiment will be described below.

As described above, since the position of the eyes of the driver falls within the light interruption direction formed through the louver type filter 10 and liquid crystal filter 2, each louver 21 being arranged so as to be inclined as shown in FIG. 4 (B), the TV monitor images cannot easily be seen from the driver's seat side and thus the light interruption area at the driver's seat side can be widened. In contrast with the driver's seat position, from the passenger seat side, positioned opposite the driver's seat side, the TV monitor images can be clearly viewed since this position lies directly in the transmitting direction of the louver type filter 10.

Figure 5:
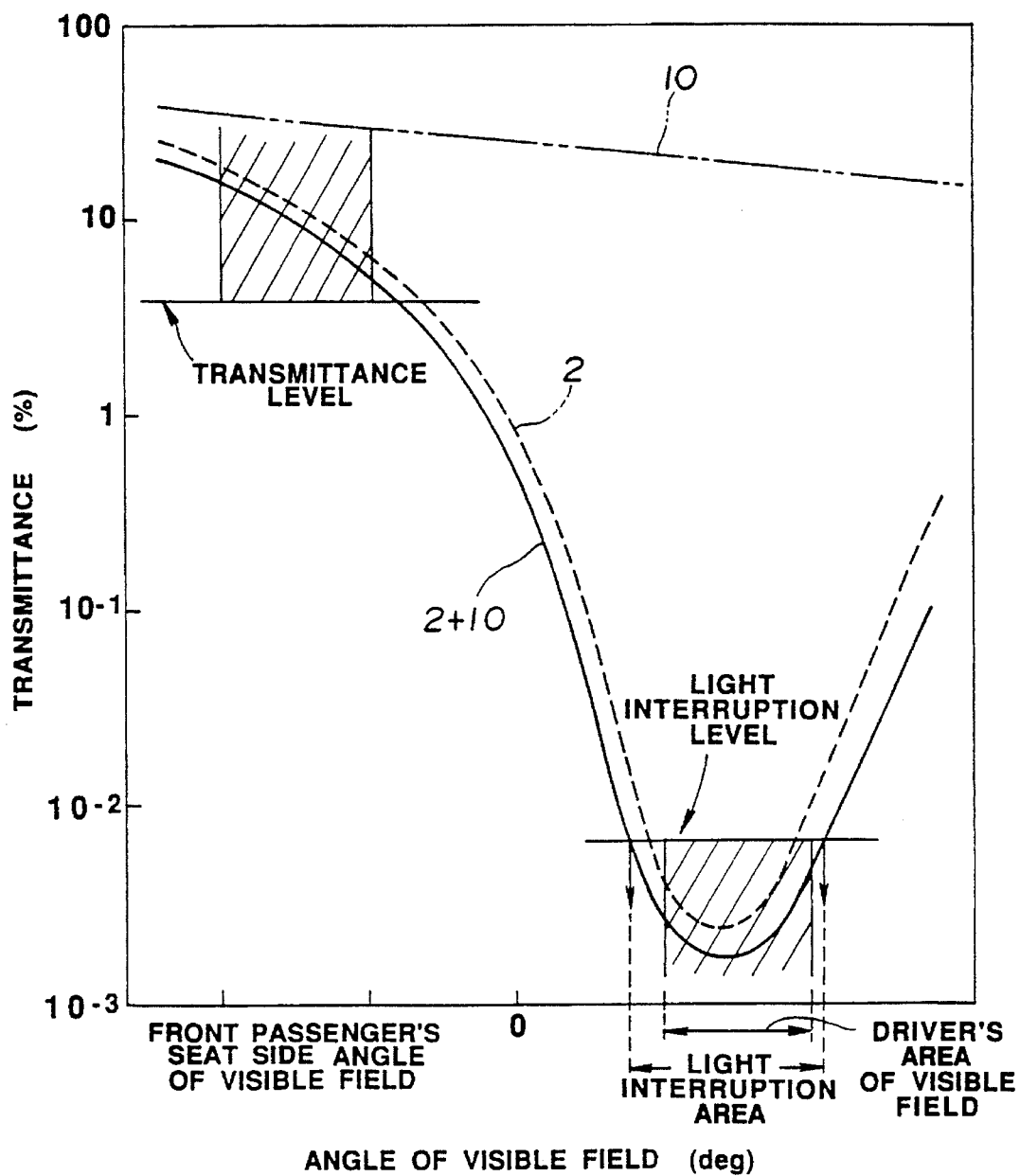
FIG. 5 is a characteristic graph of a relationship between light transmittance and angle of visible field in the case of the first preferred embodiment shown in FIGS. 4 (A) and 4 (B).

FIG. 5 shows a characteristic graph representing the relationship between viewer position and transmittance for the first preferred embodiment of FIG. 4 (A) and FIG. 4 (B).

AS shown in FIG. 5, the light interruption area at the driver's seat position is wide compared with the driver's field of vision.

Figure 6:
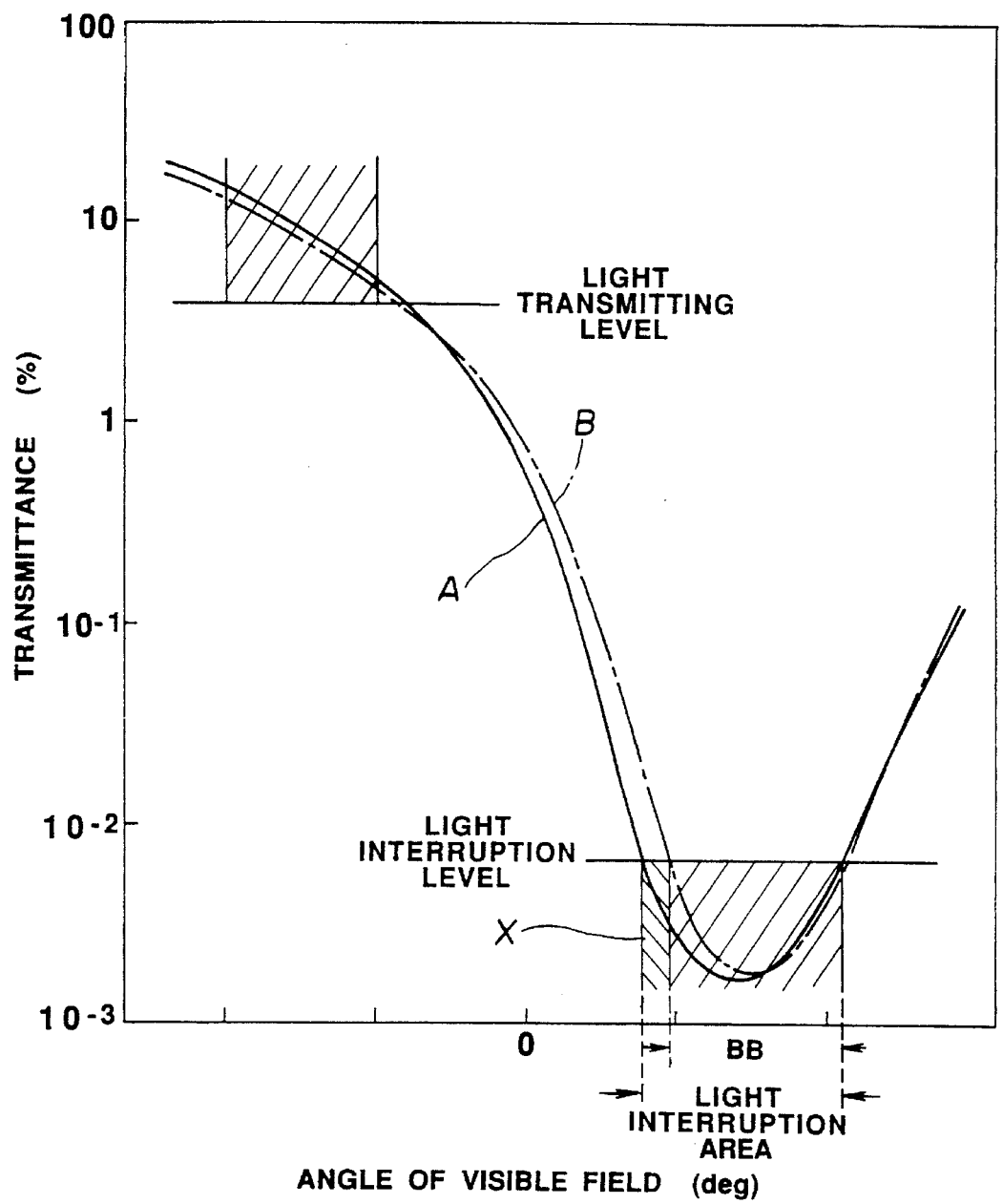
FIG. 6 is a characteristic graph of the relationship between the light transmittance and angle of visible field in the case of the first preferred embodiment shown in FIG. 4 (A) and the previously proposed TV image displaying apparatus shown in FIG. 2 (A).

FIG. 6 shows a characteristic comparison between the characteristics of the prior art, denoted by a solid line in FIG. 1, and those of the present invention, denoted by a solid line in FIG. 5.

It is noted that the solid line of A in FIG. 6 is the characteristic graph A of the first preferred embodiment shown in FIGS. 4 (A) and 4 (B) and the dot-and-dash line in FIG. 6 is the characteristic graph B of the previously proposed TV image displaying apparatus. In FIG. 6, BB denotes the light interruption area achieved in the previously proposed TV image displaying apparatus.

As shown in FIG. 6, the light interruption area at the driver's seat side represented by a line A can be widened by approximately 20%, i.e., a portion of oblique lines denoted by X, as compared with the characteristic, denoted by line B, representing the previously proposed TV image displaying apparatus and the light interruption area denoted by BB.

The above characteristic shown in FIG. 6 is a characteristic in cases where the louver type filter 10 is used (refer to FIG. 4 (B)) having a characteristic visible angle of 90° and a louver angle of 0° and the application voltage across the liquid crystal filter 2 is set relatively higher than the previously proposed TV image displaying apparatus described in the BACKGROUND OF THE INVENTION.

It is noted that the louver angle is defined as an angle formed between a plane perpendicular to the plate of the louver type filter 10 and the respective louvers 21. In the case shown in FIG. 3 (B), the louver angle is 0°.

In the case described above, if the louver type filter 10 is installed having the louver angle described above, light transmittance at the driver's seat side of the louver type filter 10 is more or less reduced (refer to the dot, dot-and-dash line of FIG. 5) when the application voltage across the liquid crystal filter is in the off state (safe stop state).

However, as appreciated from FIG. 5, no problem arises since the liquid crystal filter is provided with more than the required transmittance level.

Figure 7:
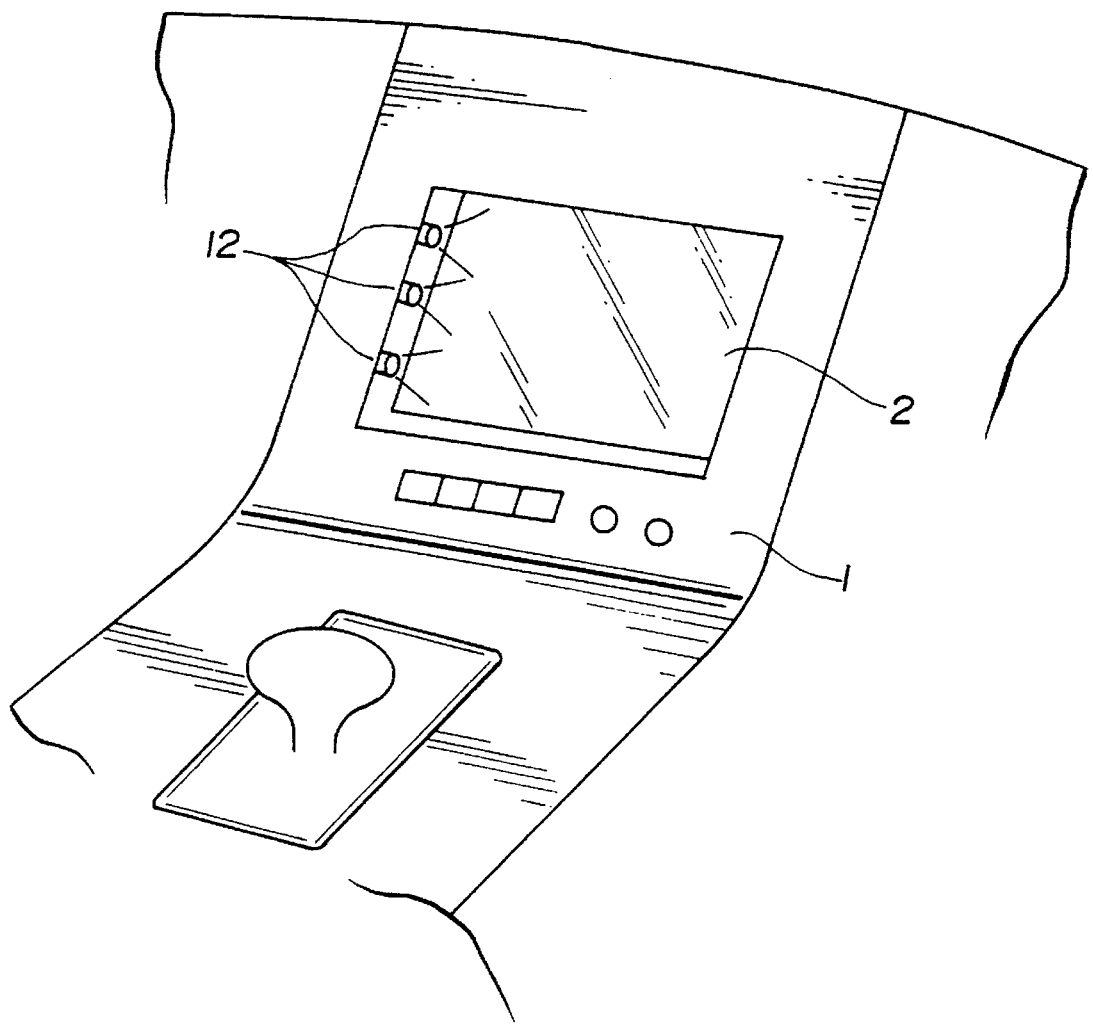
FIG. 7 is a general view of the TV image displaying apparatus in a second preferred embodiment according to the present invention.

Next, FIG. 7 shows a second preferred embodiment of the TV image displaying apparatus.

In the second preferred embodiment, a plurality of lamps 12 are installed along a peripheral direction of an edge of the TV monitor 1 (particularly the left side as viewed from the driver's seat position) of the TV monitor 1 and liquid crystal filter 2, in place of the louver type filter 10.

When the lamps 12 are turned on so that light beams from the lamps 12 impinges on the screen of the TV monitor 1, the light interruption area toward the driver's seat position can substantially be widened as compared with the previously proposed TV monitoring apparatus.

Figure 8:
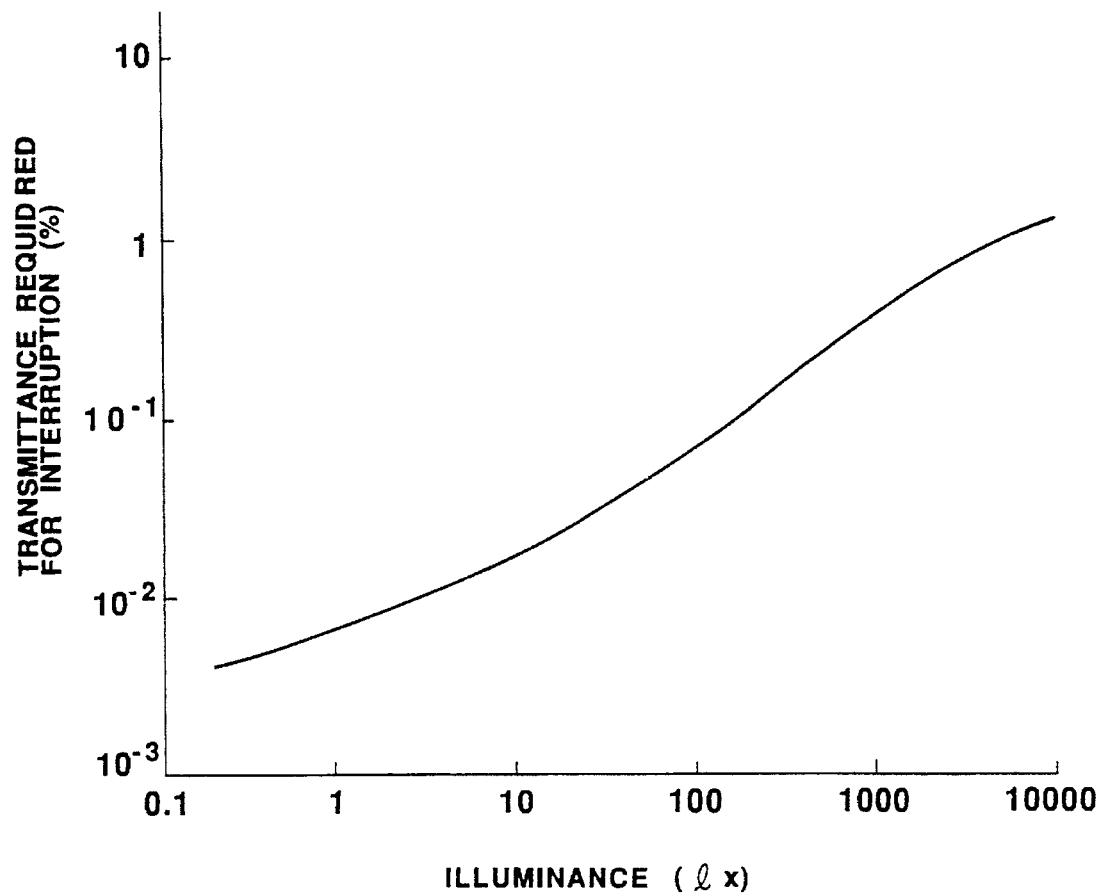
FIG. 8 is a characteristic graph of a relationship between illuminance (lx) and transmittance required for light interruption in the case of the second preferred embodiment shown in FIG. 7.

For example, FIG. 8 shows a characteristic graph comparing the light illuminance of the lamps used in the second preferred embodiment with respect to the transmittance level of the liquid crystal filter 2 required for providing the light interruption area for the driver's seat position.

Figure 9:
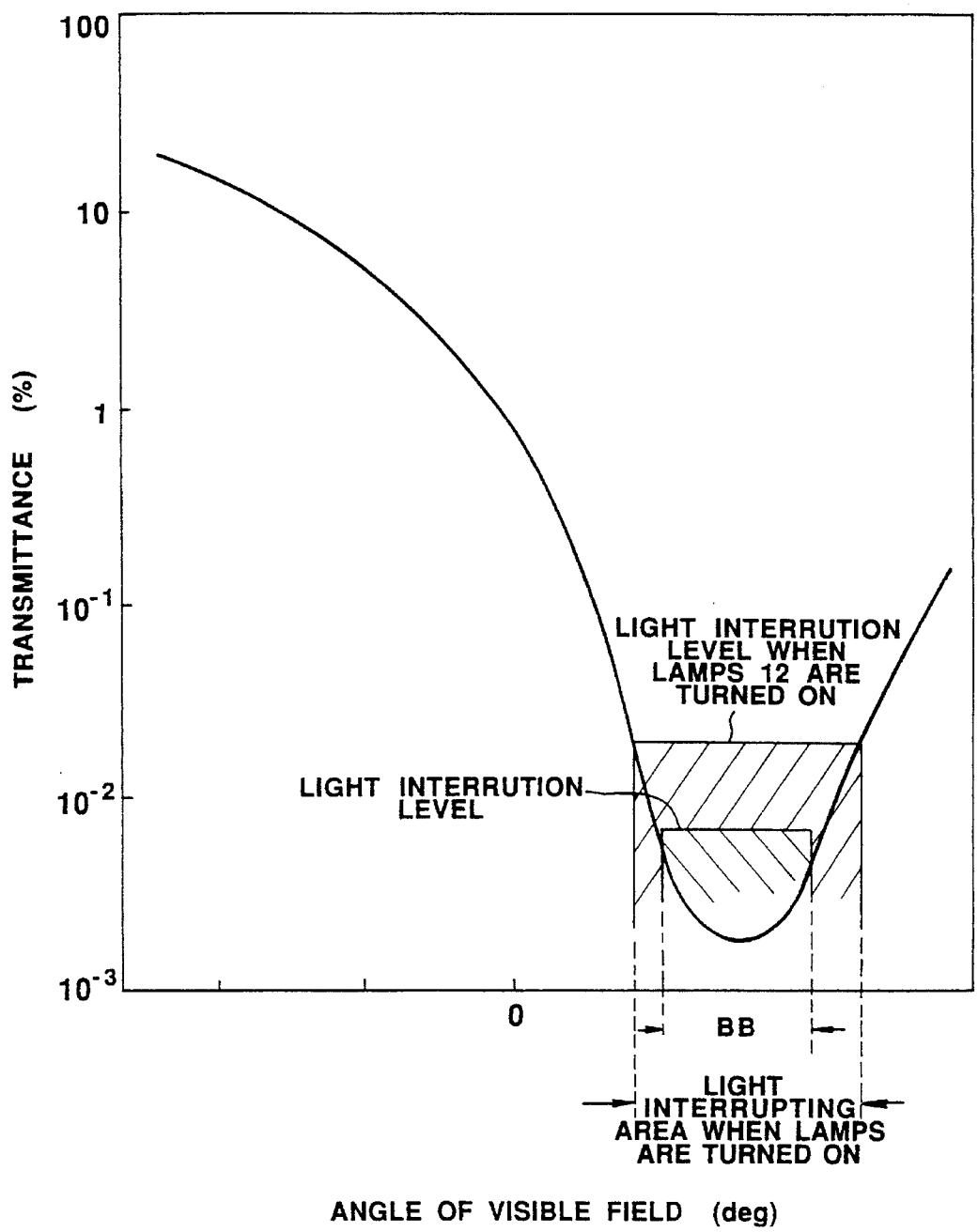
FIG. 9 is a characteristic graph of a relationship between an angle of visible field and transmittance in the case of the second preferred embodiment shown in FIG. 7 and the previously proposed TV image displaying apparatus shown in FIG. 2 (A).

The illuminance on the TV monitor screen is at a condition of 0.1 lx (equivalent to moonlight). The lamps 12 are installed on the peripheral side of the TV monitor 1 and are used to impinge the image on the monitor by producing light beams having an illuminance of about 10 lx in the second preferred embodiment. Consequently, the light interruption area at the driver's seat side can substantially be widened as can be appreciated from FIG. 9.

It is noted that the TV images cannot easily be seen from the driver's seat side due to the presence of high ambient light during the daytime and that each of the lamps 12 provides no deflection and projects lights only toward the screen of the TV monitor 1 so as not to affect viewing of the TV monitor 1 from the front passenger's seat position.

It will be noted that, optionally, during the night time, the lamps 12 may be associated with a headlamp switch (not shown) of the vehicle to place the lamps in an active state or, alternatively, to adjust lamp intensity to compensate for different ambient lighting conditions.

Other methods of widening the light interruption area at the driver's seat side may include a method in which the application voltage to be supplied to the liquid crystal filter 2 is increased and the maximum contrast direction is shifted toward the passenger's seat side or a method in which the whole luminance level of the TV monitor is reduced. However, in the former method, light transmittance (brightness) on the drivers side is reduced and, in the latter method, light transmittance on the passenger's seat side is reduced.

Therefore, the above-described methods are not preferable from a practical point of view.

As described hereinabove, according to the present invention, the TV image displaying apparatus of the present invention can widen the light interruption area applied to a driver's seat position by an area wider than the previously proposed TV image displaying apparatus by using a louver type filter in which an angle formed between an end surface of the louver type filter and each louver is inclined by a predetermined angle as described in the first preferred embodiment, or by using lamps installed at one side of the TV monitor screen as in the second preferred embodiment. The light interruption area on the driver's seat side can be widened. The light transmittance on the driver's seat side is set lower than that on the passenger seat side. Therefore, even though the posture of the driver may incline toward the passenger seat position during vehicle run, the TV images cannot be viewed by the driver due to the widened light interruption area and safety can be assured. In addition, the passenger's seat side located laterally opposite to the driver's seat side falls directly in the light transmitting direction of the louver type filter (of the first preferred embodiment) and liquid crystal filter with the lamps turned on (of the second preferred embodiment).

Therefore, TV images -can more clearly be viewed under conditions preferable to those of previously proposed TV image displaying apparatus.

Further, since louver type filters are already in use, preparation of a louver filter in which the louvers are inclined as shown in FIG. 4 (B) and as described in the first preferred embodiment is not difficult from a manufacturing standpoint.

Thus, a total cost of installing the TV image displaying apparatus will not be largely increased.

It will fully be appreciated by those skilled in the art that the foregoing description has been made in terms of the preferred embodiments and various changes and modifications may be made without departing from the scope of the present invention which is to be defined by the appended claims.

What is claimed is:

1. An apparatus for providing TV images on a TV monitor applicable to a vehicle passenger compartment, comprising:

a) filter means, located on a front end of a TV monitor screen and having variable transmittance, for adjusting a visible recognition area of the images appearing on the TV monitor screen so that light from the images directed toward a driver's seat of the vehicle is interrupted;

b) first detecting means for detecting whether the vehicle is moving and producing a first signal indicative thereof;

c) controlling means responsive to said first signal output from the first detecting means for controlling said filter means so as to provide no image from the TV monitor screen toward the driver's seat side while the vehicle is moving by providing a first light interruption area interrupting transmission of light from the TV monitor images to the driver's seat position; and d ) light transmission area restricting means, active in combination with the filter means, for further providing a second light interruption area wider than the first light interruption area for the driver's seat position while preventing reduction of transmittance toward a front passenger's seat side so that a light transmittance area for the front passenger's seat side has relatively high transmittance;

wherein the light transmission area restricting means comprises a louver type filter having a plurality of louvers, each louver being inclined so that longitudinal directions of said plurality of louvers are aligned and are substantially downwardly directed toward the driver's seat position through a predetermined louver angle with respect to a horizontal direction of the TV monitor screen, for preventing light from the images on the TV monitor screen, which passes through the louvers, from reflecting on an inner surface of a front windshield to reach a driver's eye position.

2. An apparatus as set forth in claim 1, wherein the filter means comprises a liquid crystal filter having a dimension substantially covering the television monitor screen, a surface electrode being provided on a whole surface thereof for receiving the predetermined voltage from the controlling means so that the liquid crystal filter adjusts the visible recognition area of the television images.

3. An apparatus as set forth in claim 2, wherein during use of the louver type filter, the second light interruption area is wider than the first light interruption area by at least 20 percent, said widened light interruption area extending in a direction toward a front passenger seat from the driver's seat.

4. An apparatus as set forth in claim 2, wherein the louver type filter is installed between the television monitor screen and liquid crystal filter with the elongate directions of the respective louvers constituting the louver type filter being directed toward the driver's seat position.

5. An apparatus as set forth in claim 1, wherein the television monitor is installed on a center console of the passenger compartment.

6. An apparatus for providing TV images on a TV monitor applicable to a vehicle passenger compartment, comprising:

a) filter means, located on a front end of a TV monitor screen and having variable transmittance, for adjusting a visible recognition area of the images appearing on the TV monitor screen so that light from the images directed toward a driver's seat of the vehicle is interrupted;

b) first detecting means for detecting whether the vehicle is moving and producing a first signal indicative thereof;

c) controlling means for controlling said filter means so as to provide no image from the TV monitor screen toward the driver's seat side while the vehicle is moving in response to the signal output from the first detecting means, said controlling means providing a predetermined voltage for the filter means in response to the signal output from the first detecting means so that a first light interruption area interrupting the transmission of the TV monitor images to the driver's seat position is provided; and d) light transmission area restricting means, active in combination with the filter means, for further providing a second light interruption area wider than the first light interruption area for the driver's seat position while preventing a whole transmittance toward a front passenger's seat side from being reduced so that the light transmitting area for the front passenger's seat side has relatively high transmittance, wherein the light transmission area restricting means comprises a plurality of lamps installed on a periphery of the TV monitor, said lamps being associated with a headlamp switch of the vehicle.

7. An apparatus as set forth in claim 6, wherein said lamps are positioned such that light beams from the lamps impinge on the television monitor screen when head lamps of the automotive vehicle are turned on and wherein the light interruption area when using the lamps is substantially equivalent to the second light interruption area.

8. An apparatus as set forth in claim 6, wherein an intensity of said lamps is adjusted according to whether or not said headlamp switch is activated for insuring said second light interruption area under different ambient lighting conditions.

9. An apparatus as set forth in claim 6, wherein the intensity of said lamps is varied so as to provide a constant illuminance from the television monitor screen during day time and night time ambient light conditions.

10. An apparatus for providing television images for a vehicle cabin, comprising:

a) image projecting means for projecting television images from a screen thereof toward a space defined as a television viewing angle including at least a driver's seat position and a front passenger's seat position;

b) liquid crystal filter means located above the screen of the image projecting means for selectively setting a variable recognition area in the space in response to an application of voltage across a whole surface electrode thereof;

c) detecting means for detecting whether the vehicle is in a moving or stationary state and outputting an indicative signal when said vehicle is moving;

d) controlling means responsive to reception of said indicative signal from said detecting means for controlling the liquid crystal filter means to provide a first light interruption area of the liquid crystal filter means from the image projecting means to the driver's seat position, while at least providing a light transmission area of the liquid crystal filter means from the image projecting means to the passenger's seat position; and e) light transmission area restricting means, active in combination with the liquid crystal filter means, for further increasing at least the first light interruption area of the liquid crystal filter means while providing substantially no effect on the light transmission area provided by the liquid crystal filter means, wherein the light transmission area restricting means includes a louver type filter having a plurality of louvers located between the screen of the image projecting means and the liquid crystal filter means, the respective louvers being inclined at a predetermined louver angle so that elongate directions thereof are aligned and are directed toward the driver's seat position at said predetermined louver angle with respect to a horizontal direction of the screen of the image projecting means, for preventing the light beams from the images on the image projecting means, which passes through the louvers, from reflecting on an inner surface of a windshield of the vehicle to reach a driver's eye position.

11. An apparatus as set forth in claim 10, wherein the image projecting means is a television monitor installed on a center console of the passenger compartment.

12. An apparatus as set forth in claim 10, wherein the light transmission restricting means further increases the first light interruption area of the liquid crystal filter means by approximately 20 percent.

13. An apparatus as set forth in claim 10, wherein the increased light interruption area is located toward the passenger seat position from the driver's seat position.

14. An apparatus for providing television images for a vehicle cabin, comprising:

a) image projecting means projecting television images from its screen toward a space defined as a television viewing angle including at least a driver's seat position and a front passenger's seat position;

b) liquid crystal filter means located above the screen of the image projecting means for selectively setting a variable recognition area in the space in response to an application of voltage across a whole surface electrode thereof;

c) detecting means for detecting whether the vehicle is in a moving or stationary state and outputting an indicative signal when said vehicle is moving;

d) controlling means for controlling the liquid crystal filter means to provide a first light interruption area of the liquid crystal filter means from the image projecting means to the driver's seat position, while at least providing a light transmitting area of the liquid crystal filter means from the image projecting means to the passenger seat position when the signal output from the detecting means is received; and e) light transmission area restricting means, active in combination with the liquid crystal filter means, for further increasing at least the first light interruption area of the liquid crystal filter means while providing substantially no effect on the light transmission area provided by the liquid crystal filter means, wherein said light transmission area restricting means further comprises a plurality of lamps installed along a peripheral side of the image projecting means, the light beams radiated from the lamps being directed only toward the screen of the image projecting means, wherein said lamps are associated with a head lamp switch of the vehicle.

15. An apparatus as set forth in claim 14, wherein the plurality of lamps are installed on a periphery of the image projecting means so that light beams from the lamps impinge on a screen of the image projecting means when head lamps of the automotive vehicle are turned on, the light interruption area when using the lamps being greater than the first light interruption area.

16. An apparatus as set forth in claim 14, wherein an intensity of said lamps is adjusted according to whether or not said headlamp switch is activated for insuring said greater light interruption area under different ambient lighting conditions.

17. An apparatus as set forth in claim 17, wherein the intensity of said lamps is varied so as to provide a constant illuminance from the image projecting means during the day time and night time ambient light conditions.

18. An apparatus as set forth in claim 17, wherein the peripheral side is located toward the front passenger's seat position.

\* \* \* \* \*